United States Patent
Bender et al.

(10) Patent No.: US 10,896,144 B2
(45) Date of Patent: Jan. 19, 2021

(54) AUTOMATED CONFIGURING OF COMPUTER SYSTEM SETTINGS FOR PERIPHERAL DEVICE(S)

(71) Applicant: INTERNATIONAL BUSINESS MACHINES CORPORATION, Armonk, NY (US)

(72) Inventors: Michael Bender, Rye Brook, NY (US); Keith R. Walker, Austin, TX (US); Todd P. Seager, Orem, UT (US); Thomas A. Morse, Marble Dale, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 15/973,728

(22) Filed: May 8, 2018

(65) Prior Publication Data
US 2019/0347230 A1    Nov. 14, 2019

(51) Int. Cl.
*G06F 3/00* (2006.01)
*G06F 13/38* (2006.01)
*G01S 19/14* (2010.01)

(52) U.S. Cl.
CPC ............ *G06F 13/385* (2013.01); *G01S 19/14* (2013.01)

(58) Field of Classification Search
CPC ............................... G06F 13/385; G01S 19/14
USPC ............................................................ 710/8
See application file for complete search history.

(56) References Cited

U.S. PATENT DOCUMENTS

| | | | |
|---|---|---|---|
| 8,972,617 B2 | 3/2015 | Hirschman | |
| 9,075,435 B1* | 7/2015 | Noble | G06F 3/013 |
| 9,081,535 B2 | 7/2015 | Panvelwala | |
| 9,547,467 B1* | 1/2017 | DeLuca | G06F 3/1446 |
| 9,600,220 B2* | 3/2017 | Drake | G06Q 30/0267 |
| 2005/0086328 A1* | 4/2005 | Landram | H04L 67/34 709/220 |

(Continued)

FOREIGN PATENT DOCUMENTS

WO    WO 2011/022014 A1    2/2011

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

(Continued)

*Primary Examiner* — Chun Kuan Lee
(74) *Attorney, Agent, or Firm* — Michael A. Petrocelli, Esq.; Kevin P. Radiqan, Esq.; Heslin Rothenberg Farley & Mesiti P.C.

(57) ABSTRACT

Automated configuring of system settings of a computer for a peripheral device(s) is provided. The configuring process includes determining, by the computer, that a peripheral device has been connected to the computer, and based on the determining, ascertaining profile-related data for use in configuring computer system settings for the peripheral device connected to the computer. The ascertained profile-related data is used to identify, by the computer, a settings profile for the peripheral device from saved settings profiles for one or more peripheral devices. Based on the identified settings profile, the computer system settings for the peripheral device are configured.

15 Claims, 8 Drawing Sheets

(56) References Cited

U.S. PATENT DOCUMENTS

| | | | |
|---|---|---|---|
| 2009/0243959 A1* | 10/2009 | Pering | G06F 3/1423 |
| | | | 345/1.3 |
| 2012/0144307 A1* | 6/2012 | Tan | G06F 3/038 |
| | | | 715/735 |
| 2017/0075638 A1* | 3/2017 | Poornachandran | G06F 3/1423 |
| 2017/0163847 A1* | 6/2017 | Ogura | H04N 1/442 |
| 2017/0242480 A1 | 8/2017 | Dees et al. | |
| 2017/0357408 A1* | 12/2017 | Anglin | H04W 4/021 |
| 2018/0032301 A1* | 2/2018 | Jeacocke | G06F 3/017 |
| 2018/0046423 A1 | 2/2018 | Abraham et al. | |

OTHER PUBLICATIONS

International Business Machines Corporation (IBM), "z/Architecture Principles of Operation," IBM® Publication No. SA22-7832-10, Eleventh Edition, Mar. 2015, (pp. 1-1732).

International Business Machines Corporation (IBM), "Power ISA™ Version 2.07B," Apr. 9, 2015, (pp. 1-1527).

Bender et al., "Automated Configuring of One or MOre Computer System Settings for Peripheral Device(s)", U.S. Appl. No. 15/973,749, filed May 8, 2018 (45 pages).

Bender et al., "List of IBM Patent and Patent Applications Treated as Related", U.S. Appl. No. 15/973,728, filed May 8, 2018, dated May 8, 2018 (2 pages).

* cited by examiner

AUTOMATED CONFIGURING OF COMPUTER SYSTEM SETTINGS FOR PERIPHERAL DEVICE(S)

BACKGROUND

Multi-display monitor computer system setups have become commonplace today. For instance, many users find multitasking on a single screen too confining, and therefore seek to connect one or more additional displays to their computer. The one or more additional displays, or other peripheral devices, could be configured for a variety of positions relative to, for instance, a primary display of the computer. For example, an additional display monitor could be on the right side or the left side of the primary display in a horizontal configuration, above or below the primary display in a vertical configuration, or otherwise disposed, such as mounted on a wall of a room where the computer is located.

In order for a computer and the peripheral devices to function as intended, system configuration settings for the peripheral device need to be set by the user for the desired operation. While the setup process is typically not an issue when the computer and peripheral device(s) remain at a fixed location, in a fixed configuration, the process may become more burdensome when the computer, such as a portable computer, is transported often between locations, with different peripheral devices in different configurations potentially being used at each location. For instance, depending on the particular location, the desired position of a peripheral device may change. This typically requires a user to configure, or reconfigure, system settings for the peripheral device(s) each time the user transports the computer between locations. Further, different users may have different desired peripheral device setups, with each change of user possibly requiring a change in the peripheral device settings profile within the computer.

SUMMARY

Certain shortcomings of the prior art are overcome and additional advantages are provided through the provision, in one or more aspects, of a computer program product for configuring system settings of a computer for a peripheral device. The computer program product includes a computer-readable storage medium having program instructions embodied therewith. The program instructions are executable by a processor to cause the processor to determine that a peripheral device has been connected to the computer, and ascertain, based on the determining, profile-related data for use in configuring computer system settings for the peripheral device connected to the computer. The ascertained profile-related data is then used to identify a settings profile for the peripheral device from saved settings profiles for one or more peripheral devices, and the computer system settings for the peripheral device are configured using the identified settings profile.

In another aspect, a system for configuring system settings of a computer for a peripheral device is provided. The system includes a memory, and a processor communicatively coupled to the memory. The system performs a method, which includes determining that a peripheral device has been connected to the computer, and based on the determining, ascertaining profile-related data for use in configuring computer system settings for the peripheral device connected to the computer. Further, the method includes using the ascertained profile-related data to identify a settings profile for the peripheral device from saved settings profiles for one or more peripheral devices, and configuring computer system settings for the peripheral device using the identified settings profile.

In a further aspect, a method of configuring system settings of a computer for a peripheral device is provided. The method includes determining, by the computer, that a peripheral device has been connected to the computer, and based on the determining, ascertaining, by the computer, profile-related data for use in configuring computer system settings for the peripheral device connected to the computer. Further, the method includes using the ascertained profile-related data to identify, by the computer, a settings profile for the peripheral device from saved settings profiles for one or more peripheral devices. The computer then configures system settings for the peripheral device using the identified settings profile.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to facilitate, for instance, providing a process, system and/or computer program product for configuring system settings of a computer for a peripheral device.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Figure 1A:
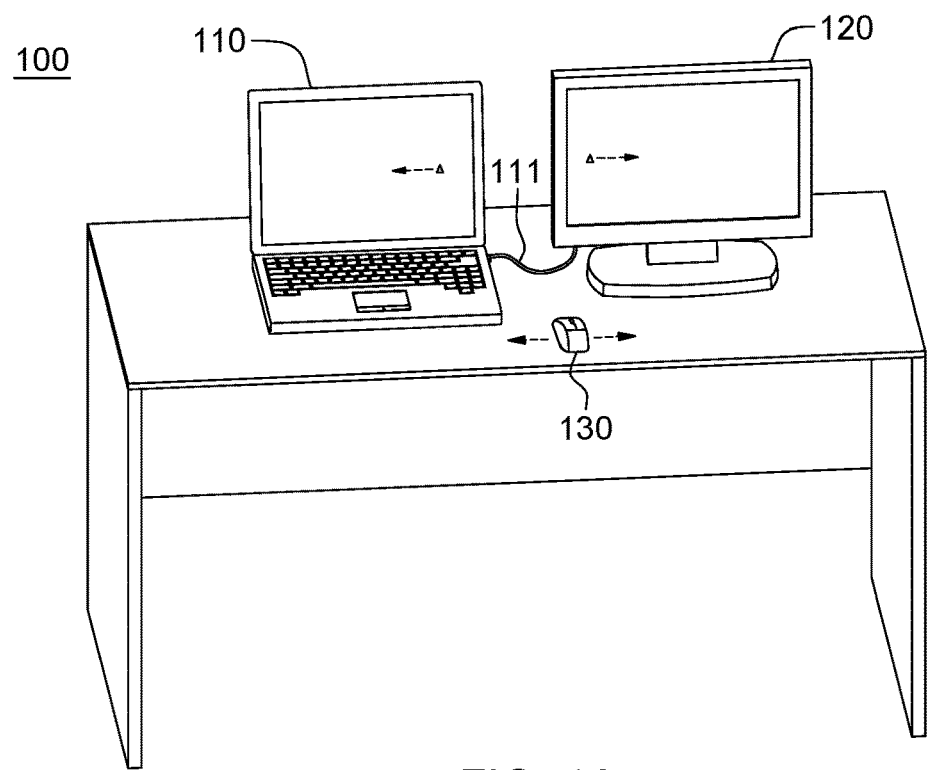
FIG. 1A depicts one embodiment of a computer, at a first location, with an attached peripheral display device for which computer system settings may be set, in accordance with one or more aspects of the present invention.

As noted initially, it is commonplace today for a computer to have one or more peripheral devices connected to the computer in a desired configuration. For instance, one or more peripheral display devices may be connected to a computer for use in association with a primary display of the computer as one or more extended displays. FIG. 1A depicts one embodiment of a location 100 containing a computer 110, such as (for example only) a transportable or portable computer, having a peripheral display device 120 connected 111 thereto and disposed on the right side of the primary display of computer 110. Further, a wireless peripheral device 130, such as a wireless mouse, is also depicted by way of example. In one or more embodiments, it may be desirable for peripheral display device 120 to be configured as an extended display from the primary display of computer 110, with the cursor being movable from one display to the other by sliding the mouse to the right or left as indicated. In order for the peripheral display device 120 to be used as an extended display, computer system settings (such as operating system display settings) need to be set by the user to indicate the location of the peripheral device relative to the computer, or computer's display. This would allow the operating system of computer 110 to move the cursor seamlessly between displays with a left motion or right motion of wireless peripheral device 130, as illustrated.

Figure 1B:
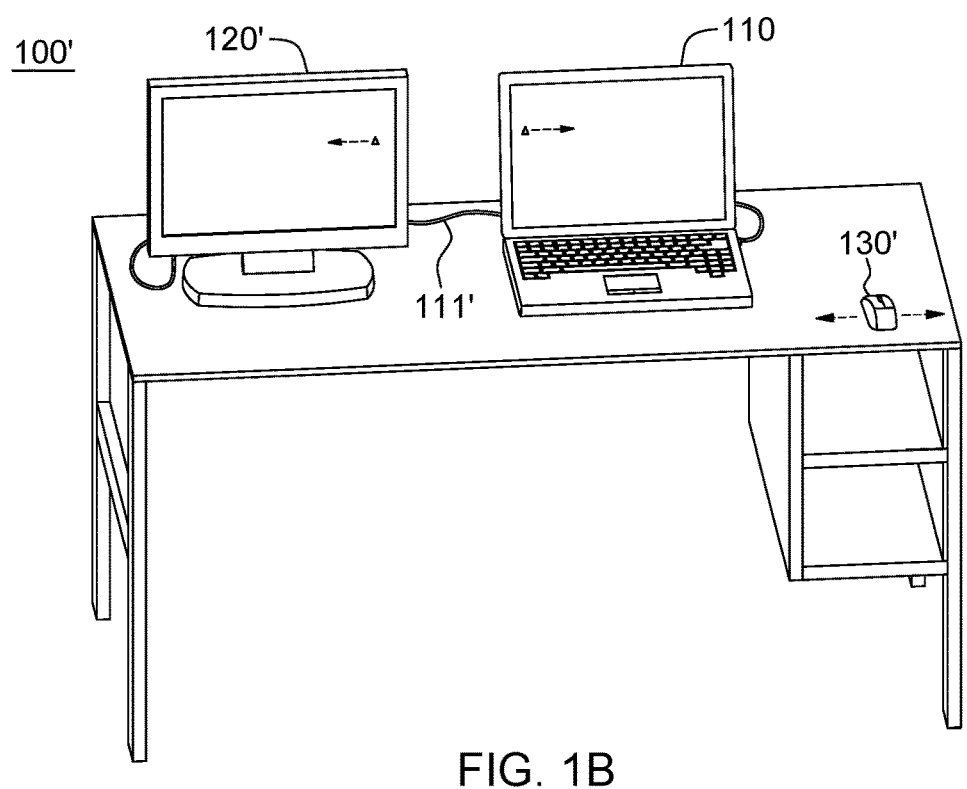
FIG. 1B depicts one embodiment of the computer of FIG. 1A, at a second location, with an attached peripheral display device for which computer system settings may be set, in accordance with one or more aspects of the present invention.

FIG. 1B depicts computer 110 at a different location 100' than location 100 of FIG. 1A. At this location, and by way of example only, a different peripheral display device 120' (for use as an extended display) has been connected 111' to computer 110 and disposed on the left side of the computer. A wireless peripheral device 130', such as a wireless mouse, and peripheral display device 120' are assumed to be configured within computer system settings such that the cursor may be moved between the primary display of computer 110 and the peripheral display device 120' by sliding wireless peripheral display 130' to the left or right as indicated. In particular, at location 100', peripheral display device 120' is shown on the left side of computer 110, and thus, at this location, the wireless peripheral device 130' is moved to the left in order to access the extended peripheral display device 120', rather than to the right, as in the setup configuration of FIG. 1A. Conventionally, each time the user transports computer 110 between location 100 of FIG. 1A and location 100' of FIG. 1B, it is necessary for the user to adjust the profile settings within computer 110 to setup the desired peripheral device(s) configuration at the current location. Further, although illustrated as having similar peripheral display monitors and wireless peripheral devices, the different locations could have different types and/or different numbers of peripheral devices connected to the computer in the same or different setup configurations.

Figure 2:
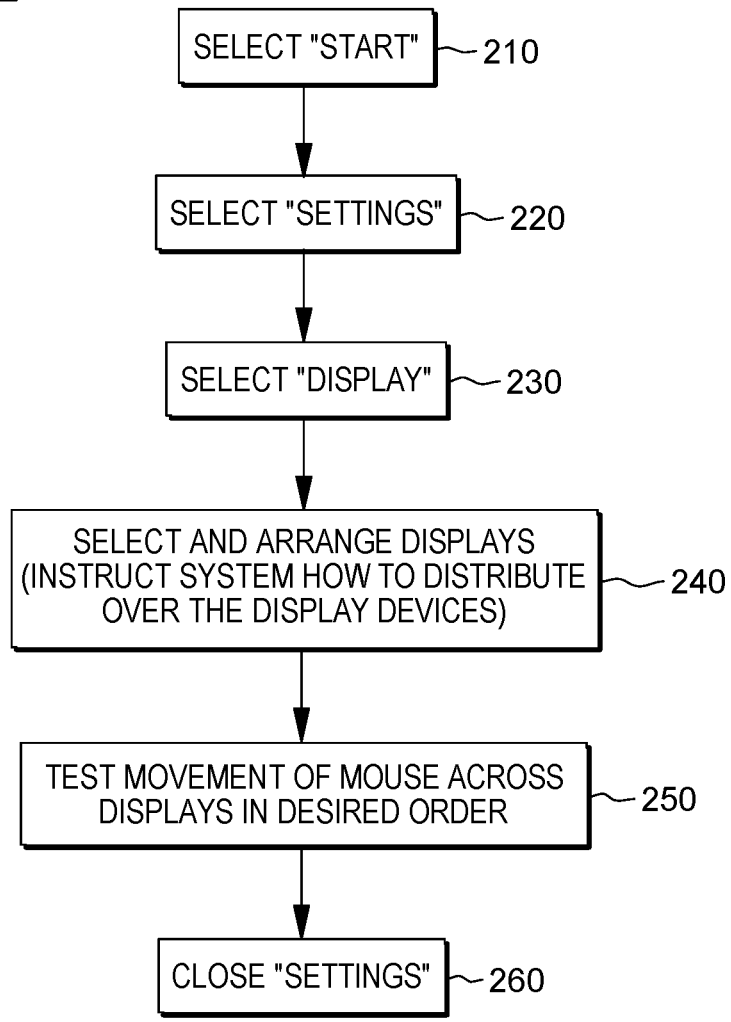
FIG. 2 depicts one embodiment of a process of setting, through a system interface, computer system settings for a connected peripheral device, such as a connected peripheral display device.

FIG. 2 depicts one embodiment of a user process 200 for configuring a peripheral display device within a computer using the operating system's settings interface. In the embodiment depicted, process 200 includes the user going to or selecting, for instance, "START" on the computer 210, and then clicking on "SETTINGS" 220. For instance, in a Windows™-based operating system (offered by Microsoft Corporation of Redmond, Wash., USA), a user might right-click on the desktop and then click "SCREEN RESOLUTION" and/or "DISPLAY SETTINGS". The display is selected 230, which allows the user to configure options where there are multiple display monitors in Windows™. In one or more implementations, the user may wish to confirm that all display monitors are detected, and click "IDENTIFY", which would cause a number to appear on each of the displays, so the computer can determine which display is which. For instance, in one or more embodiments, the user could select which display monitor to serve as the primary display, and not simply default to the display associated with the computer as the primary display. A drop-down menu may allow the user to choose whether to duplicate the primary display of the computer, e.g., desktop computer, or extend the primary display across the peripheral display devices, as discussed herein. In many multi-display monitor setups, the user chooses to extend the desktop across all displays for an extended display screen. After selecting and arranging the displays 240, movement of the cursor across the displays in the desired order may be tested 250, after which the settings profile may be saved and closed 260. As noted, each time the computer is geographically moved, for instance, due to the user traveling between home and work, peripheral device settings may need to be reconfigured, depending on the desired peripheral device setups at the different locations.

Disclosed herein, in one or more aspects, are computer program products, systems and methods for configuring system settings of a computer for a peripheral device. Advantageously, the aspects disclosed herein greatly reduce the amount of user configuring or reconfiguring of peripheral display settings within a computer each time the computer is transported between locations where different peripheral device settings may be desired. The process may include determining, by the computer, that a peripheral device has been connected to the computer, and based on the determining, ascertaining, by the computer, profile-related data for use in configuring computer system settings for the peripheral device connected to the computer. The computer then uses the ascertained profile-related data to identify a settings profile for the peripheral device from saved settings profiles for one or more peripheral devices, and configures the system settings for the peripheral device using the identified settings profile.

In one or more embodiments, the profile-related data includes location data indicative of a current location of the computer, with different settings profiles being provided for one or more peripheral devices at different locations. In one or more embodiments, the location data may be based on the Global Positioning System (such as a geofence). In one or more other embodiments, the location data may include a current Internet Protocol (IP) address of the computer. In one or more other embodiments, the location data may include an image of an environment where the computer is located, with image analytics being used to compare the image to one or more previously saved images identifying different locations with different peripheral device settings profiles. Still further, the location data may include peripheral device-specific information associated with a current location of the computer. For instance, peripheral device-specific information may include a model type or device driver information of the peripheral device, where it is assumed that a particular peripheral device is associated with a particular computer system settings profile desired by the user.

In one or more other embodiments, the profile-related data may include image data obtained by the computer, such as the above-noted location image data. The image data may be obtained, for instance, via a camera or video system associated with the computer. Alternatively, or additionally, the image data may include an image of a current user of the computer. For instance, at a home location, there may be multiple users of the computer, with two or more of the users having different desired peripheral device setups for which system setting profiles are to be saved and used.

In one or more embodiments, the peripheral device is a peripheral display device, and the identified settings profile may identify, at least in part, a location of the peripheral device relative to a primary display of the computer for a current location of the computer. This location information may be desired where the peripheral display device is to be used as an extended display device to extend the size of a primary display associated with the computer.

Figure 3:
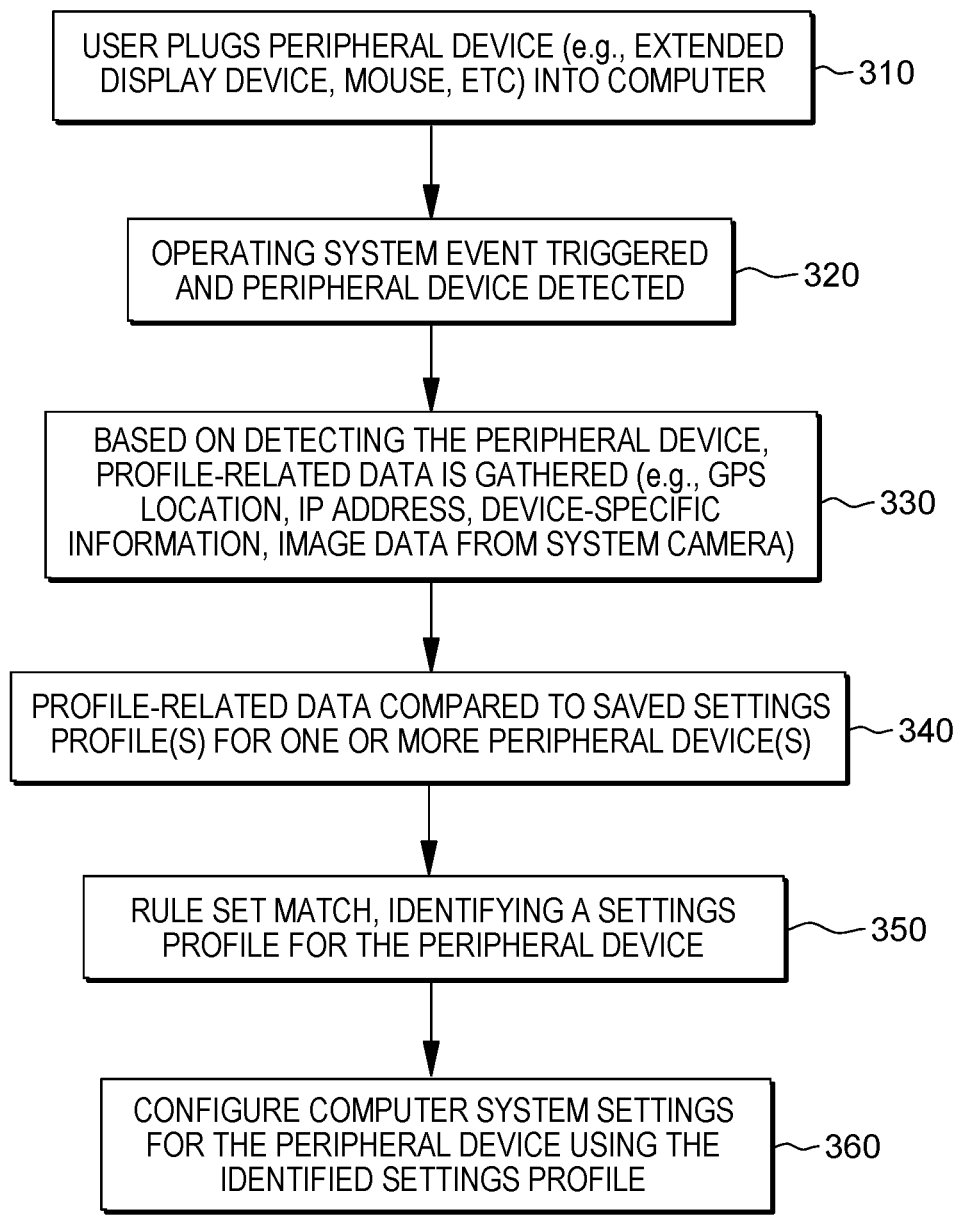
FIG. 3 depicts one embodiment of a process for configuring computer system settings for a peripheral device, in accordance with one or more aspects of the present invention.

FIG. 3 depicts one embodiment of a process 300 for configuring computer system settings for a peripheral device, in accordance with one or more aspects of the present invention. As illustrated, in process 300, a user connects a peripheral device, such as a peripheral display device, a mouse, etc., to a computer 310, such as by wirelessly connecting or physically plugging a peripheral display device into the computer. An operating system event is triggered based on the connecting and the peripheral device is detected 320. Based on detecting the peripheral device, profile-related data is gathered by the computer 330.

This profile-related data may include any of a variety of types of data, including location-specific data and/or image-specific data. For instance, the profile-related data may be based on the Global Positioning System, a current IP address of the computer, an image of an environment where the computer is located, peripheral device-specific information such as device driver information and/or model information, etc. The profile-related data is compared to corresponding data associated with saved settings profiles for one or more peripheral devices 340. Note that, in one or more implementations, the first time a particular peripheral device is to be configured at a particular location (and, if desired, for a particular user), the user enters the desired settings profile information for that device at that location through the system's settings interface. This information is then saved in a database of saved settings profiles for one or more peripheral devices at different locations that may then be subsequently accessed when the peripheral device is reconnected to the computer to compare whether that device has previously been configured at the particular location. As part of the saved data, appropriate profile-related data is retained for use in indexing into the saved settings profiles. Using the saved settings profiles, the computer determines whether there is a rule set match, identifying a settings profile for the peripheral device 350. Assuming so, then the computer system settings are configured (e.g., automatically) for the peripheral device using the identified settings profile 360.

Advantageously, the above-noted process removes the need for a user to continually reconfigure system settings for peripheral devices, such as peripheral display devices, whenever the computer, such as a laptop, or other transportable or portable computer, is moved between geographic locations. With the use of multiple saved configuration settings, the computer may detect a location change, and detect the connection of one or more peripheral devices at that location, and based thereon, automatically select the correct or desired peripheral device settings profile based on the saved settings profiles, if found. The current location of the computer may be determined by, for instance, GPS, IP address, an image taken by a camera of the computer, etc. The saved settings profile may be identified using the associated profile-related data, and used to automatically configure the computer for the peripheral device. Note that the aspects disclosed herein may be used for a variety of types of peripheral devices, with a peripheral display device, and a mouse device being two examples only.

Figure 4:
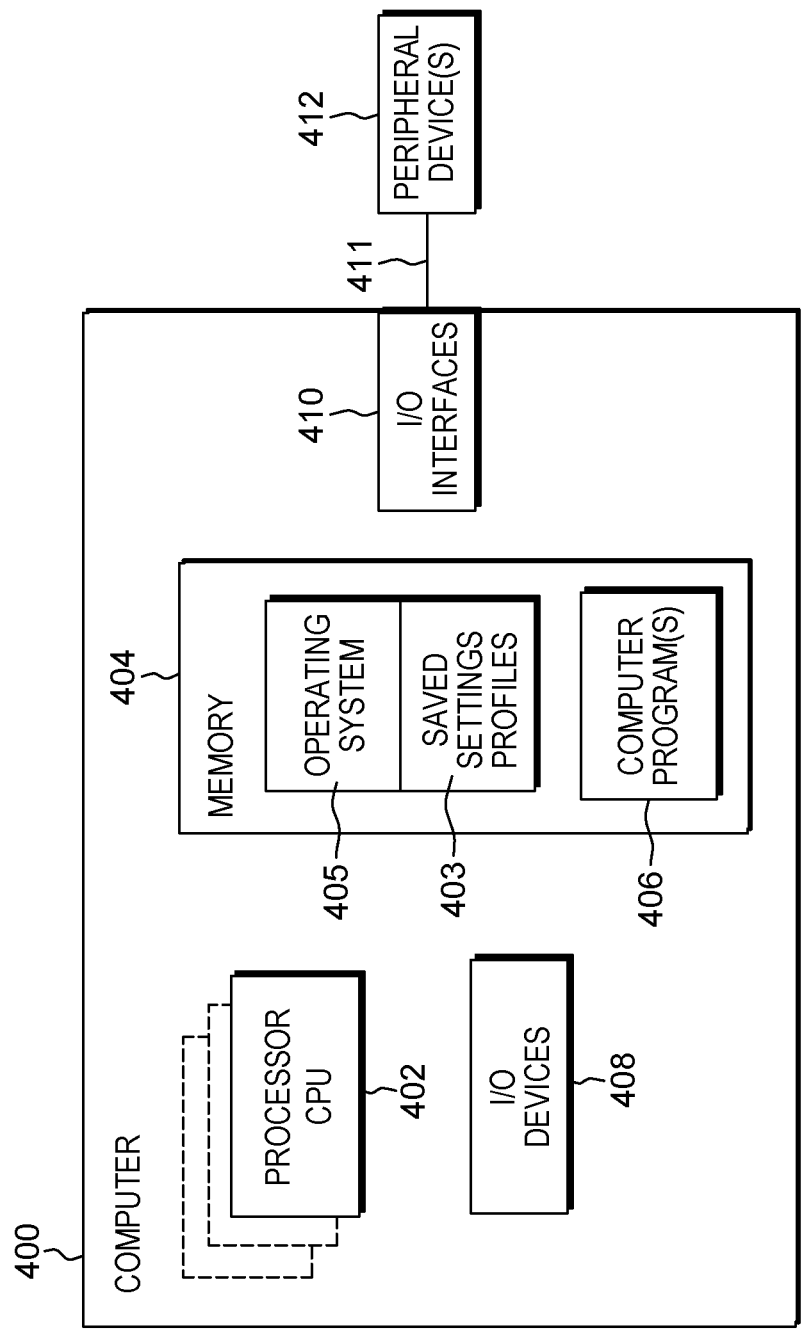
FIG. 4 is a schematic of one embodiment of a transportable computer with a peripheral device(s) connected thereto for which computer system settings may be configured, in accordance with one or more aspects of the present invention.

FIG. 4 depicts one example of a computer and associated peripheral devices to incorporate and/or use one or more aspects described herein. A computer as used herein is also referred to in the art as a data processing device/system, computing device/system/node. The computer may be based on any of a variety of system architectures and/or instructions set architectures, such as those offered by International Business Machines Corporation (of Armonk, N.Y., USA), and Intel Corporation (of Santa Clara, Calif., USA), as examples.

FIG. 4 shows a computer 400 in communication with peripheral device(s) 412. Computer 400 includes one or more processors 402, for instance, central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include a register(s) to be used by one or more of the functional components.

Computer 400 may also include memory 404, input/output (I/O) devices 408, and I/O interfaces 410, which may be coupled to processor(s) 402 and each other via one or more buses and/or other connections. Bus connections represent one or more of any of several types of bus structures, and may include a memory bus or memory controller, a peripheral bus, an accelerated graphics port, and a processor or local bus using any of a variety of bus architectures. By way of example, and not by way of limitation, such architectures include the industry standard architecture (ISA), the microchannel architecture (MCA), the enhanced ISA (EISA), the video electronics standards association (VESA) local bus, and the peripheral component interconnect (PCI).

Memory 404 can include main or system memory (e.g., random access memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, coded alike that is/are configured to carry out functions of embodiments described herein when executed by one or more processors.

Memory 404 can store an operating system 405, which may have associated therewith saved settings profiles 403, in accordance with one or more aspects described herein, as well as other computer programs 406, such as one or more computer programs/applications that may execute to perform aspects described herein. Specifically, program/applications can include computer readable program instructions that may be configured to carry out functions of embodiments of aspects described herein.

Examples of I/O devices 408 include, but aren't limited to, global positioning system (GPS) devices, cameras, lights, accelerometers, gyroscopes, magnetometers, sensors, microphones, speakers, etc. Any I/O device may be incorporated into computer 400 as desired, though in certain embodiments, an I/O device may be connected as an external or peripheral device 412 coupled to computer 400 through one or more I/O interfaces 410. By way of example, I/O devices 408 may include a primary display or monitor, and peripheral device(s) 412 may include at least one secondary, extended display or monitor.

As noted, computer 400 may communicate with one or more external devices 412 via one or more I/O interfaces 410. Example peripheral devices include a display device, keyboard, pointing device, mouse, and/or other devices that enable a user to interact with computer 400. Other example peripheral devices include any device that enables computer 400 to communicate with one or more other computer systems, such as a cloud-based computing environment, which may implement one or more aspects disclosed herein. A network interface/adapter is an example I/O interface that enables computer 400 to communicate with one or more networks, such as a local area network (LAN), a general wide area network (WAN), and/or a public network (e.g., the Internet), providing communication with other computing devices or systems, storage devices, or the like. Ethernet-based (such as WI-FI™) interfaces and Bluetooth™ adapters are examples of currently available types of network adapters used in computer systems (Bluetooth™ is a registered trademark of Bluetooth SIG, Inc., of Kirkland, Wash., USA).

The communication between I/O interfaces 410 and peripheral devices 412 can occur across wired and/or wireless communications link(s) 411, such as ethernet-based wired or wireless connections. Example wireless connections include cellular, WI-FI™, Bluetooth™, proximity-based, near field, or other types of wireless connections. More generally, communications link(s) 411 may be any appropriate wireless and/or wired communication link(s) for connecting a device to computer 400 and communicating data therebetween.

Computer 400 may take any various forms, including, for instance, transportable computers, portable computers, personal computer (PC) system(s), server computer system(s), such as messaging server(s), thin client(s), thick client(s), workstation(s), laptop(s), handheld device(s), mobile device(s)/computer(s) such as smartphone(s), tablet(s), etc.

Figure 5:
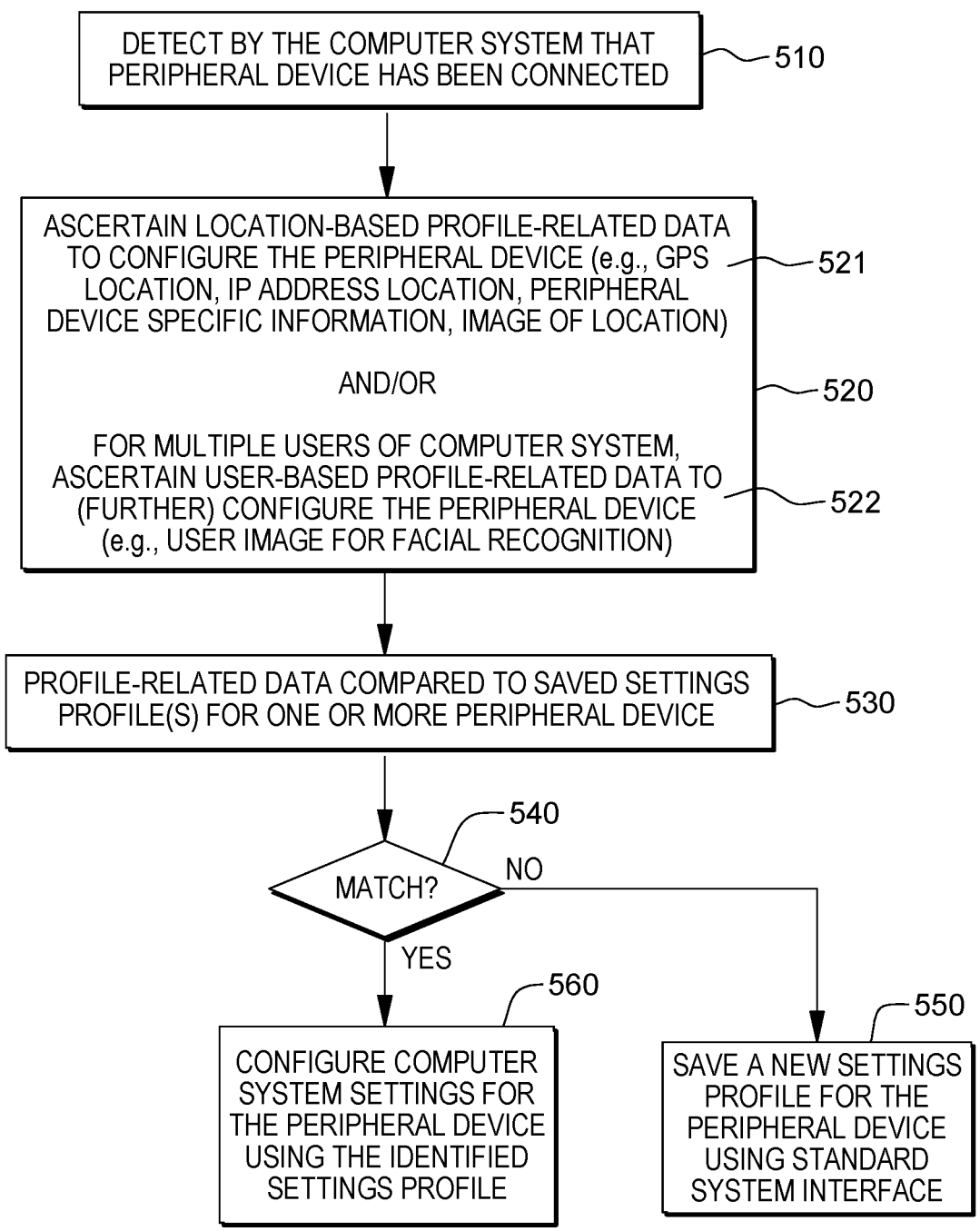
FIG. 5 depicts a more detailed embodiment of a process for configuring computer system settings for a peripheral device, in accordance with one or more aspects of the present invention.

FIG. 5 depicts a further embodiment of a process 500 for configuring computer system settings for a peripheral device, in accordance with one or more aspects of the present invention. As illustrated, process 500 includes determining or detecting by the computer that a peripheral device has been connected 510. For instance, the operating system of the computer may detect that a user has plugged one or more peripheral devices into the computer. The computer may ascertain, for instance, profile-related data for use in configuring the peripheral device 520. As noted, this may include location-based, profile-related data such as one or more of a geographical location, such as a GPS location, a current IP address location of the computer, peripheral device-specific information dependent on location, an image of an environment where the computer is located, etc. 521. Additionally, or alternatively, if there are multiple users of the computer, user-based, profile-related data may be obtained for use in configuring, or more specifically reconfiguring, the peripheral device 522. For instance, an image of a current user may be obtained and facial recognition analysis used to identify the user from, or in comparison with, one or more saved images of the users of the computer.

The ascertained profile-related data may then be compared to previously saved profile-related data of the saved settings profiles for one or more peripheral devices 530. Processing determines whether there is a match 540, and if "no", then a new settings profile is obtained from the user and saved for the peripheral device using (for instance) the standard system interface 550 of the computer (and a process, such as the process described above in connection with FIG. 2). If there is a match, then the identified settings profile may be used to (e.g., automatically) configure the computer system settings for the peripheral device 560.

Those skilled in the art will note from the above description that numerous implementations are possible using the aspects disclosed herein. By way of further explanation, the following examples are indicative of possible use of the embodiments for configuring computer system settings for a peripheral device, such as disclosed herein.

As one example, a user may sit at a desk and connect a peripheral display device to the computer. The computer may detect the additional peripheral device, and begin to use an associated camera to check for common components in the background of the user at the location where the computer is currently located. Once the location of the system is found by comparison to saved location data, the computer system checks the current location against saved settings profiles for one or more peripheral devices (for instance, for that location). If a match is found (e.g., same type of peripheral device was previously configured at that location), then the computer system settings for the peripheral device are automatically set or configured using the identified settings profile.

In another example, a user may connect a peripheral display device to a computer, and the computer detects the additional peripheral display device, and uses an associated camera to obtain image data of the user. Once the user is identified, for instance, via facial recognition, the identified user data may be used to index or compare against saved settings profiles for that user from a database of saved peripheral display device configurations. If a match is found, then the computer system settings for the peripheral display device may be set using the identified settings profile.

In another example, a user may connect a peripheral display device to a computer, and the computer may automatically detect the presence of the peripheral display device, and determine based thereon, a geographic location of the computer from (for instance) the Global Positioning System. Once the computer location is determined, the computer may ascertain whether there is an appropriate, saved peripheral display device profile for that location from a database of saved settings profiles for one or more peripheral devices. If a match is found, then the computer system settings may be automatically set using the identified settings profile.

In a further example, a user may connect a peripheral display device to a computer, and the computer detects the additional peripheral display device, and based thereon, determines a current IP address of the computer. Once the computer location is identified from, for instance, the IP address, the computer may check the current location against saved settings profiles for that location. If a match is found, then the computer system settings for the peripheral display device may be automatically set from the identified settings profile. Note that the IP address can include, for instance, public query service to detect a WAN IP, and use the detectable characteristics of the LAN, such as a gateway and DNS servers provided by DHCP. Other address-based aspects may also be used to identify a particular location of the computer.

In a further example, a user may connect a peripheral display device to a computer, and in the office, use a Dell® peripheral display device, and when home, use a Lenovo® peripheral display device. Thus, when the peripheral display device is connected to the computer, the computer may detect the connection, and ascertain a particular peripheral display device model based, for instance, on the device driver in use. Once the peripheral display device model or device driver is ascertained, that information may be used to compare against corresponding information of saved settings profiles to identify a particular settings profile for that identified peripheral display device, and once identified, the computer system settings may be configured using the identified settings profile. Note that, in one or more embodiments, this approach assumes that the peripheral display devices are not themselves transported between locations, but rather remain at the different locations, as the computer is transported between locations by the user.

Those skilled in the art will note from the above examples that, in one or more aspects, provided herein is an automated configuration process for use, for instance, by an operating system of a transportable computer, to ascertain and automatically configure or set up the computer for the peripheral device using an identified settings profile previously saved to a database of settings profiles. For instance, where the peripheral device is a peripheral display device to be used as an extended display, the system may know from a previously saved settings profile where the peripheral display device is physically located, based upon the current location of the computer, which can be determined, for instance, via a computer camera, network connectivity, GPS tracking, etc., as well as other approaches, such as disclosed above.

Those skilled in the art will further note from the description provided herein that one or more inventive aspects disclosed herein encompass improvement to a technical field, an improvement to the functioning of a computer itself, and/or aspects that are inextricably tied to computer technology. For instance, the computer program products, systems and methods recited below relate to the field of configuring computer system settings, such as operating system settings, for peripheral devices, and provide an easily adaptable process, that is also more efficient and less error-prone than a conventional, manual process of a user setting the configuration of a computer and associated peripheral device(s) each time a computer is relocated. Also, the computer program products, systems and methods disclosed herein improve the functioning of the computer itself by allowing the computer to learn over time desired computer system settings for particular peripheral devices at particular locations and/or for particular users. Still further, the computer program products, systems and methods disclosed herein are inextricably tied to computer technology, and facilitate processing within the computer itself, as they are directed to implementations of solutions to a problem in the field of computer technology where system settings must be entered for a desired configuration whenever a user or users change location of the computer and/or configuration of the peripheral devices relative to the computer. By maintaining settings profiles for one or more peripheral devices at different locations (and/or for different users), the system is able to automatically configure itself should the computer be moved to a different location and have associated therewith one or more peripheral devices for which a settings profile has already been learned by the system.

Other variations and embodiments are possible.

One example of a computer system that includes processors that may be used by one or more aspects of the present invention is described with reference to FIG. 6. In this example, the computer system is part of a computing environment including additional components that may or may not be used by aspects of the present invention.

In one example, the computing environment may be based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment may be based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 6:
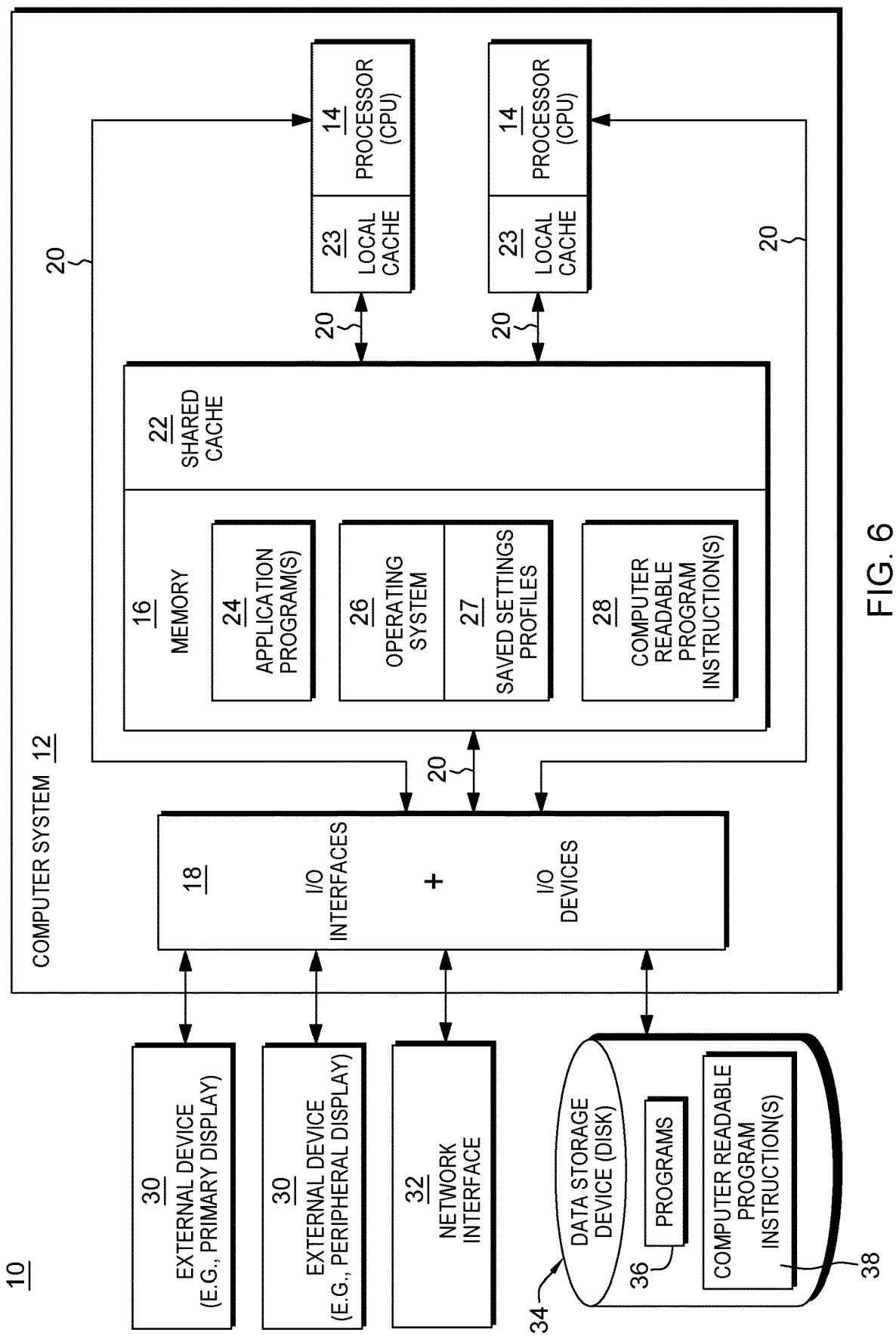
FIG. 6 depicts another example of a computing environment to incorporate and user one or more aspects of the present invention.

As shown in FIG. 6, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26 (with one or more saved settings profiles 27 associated therewith), and one or more computer readable program instructions 28. Computer readable program instructions 28 may be configured to carry out functions of embodiments of aspects of the invention.

Computer system 12 may also communicate via, e.g., I/O interfaces 18 with one or more external devices 30, one or more network interfaces 32, and/or one or more data storage devices 34. Example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 may store one or more programs 36, one or more computer readable program instructions 38, and/or data, etc. The computer readable program instructions may be configured to carry out functions of embodiments of aspects of the invention.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, may execute one or more components to perform one or more aspects of the present invention. These components may be stored in memory, including main memory (e.g., memory 16) and/or one or more caches (e.g., shared cache 22, local cache 23) and/or external storage (e.g., device 34), and may be executed by one or more processors (e.g., processor 14).

As described herein, in one or more aspects, search results from multiple types of searches (e.g., unstructured and structured) are combined in a result set. The result set is analyzed and domain knowledge is applied to provide another search (e.g., confined) to tailor and narrow the result set, providing a refined result set.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
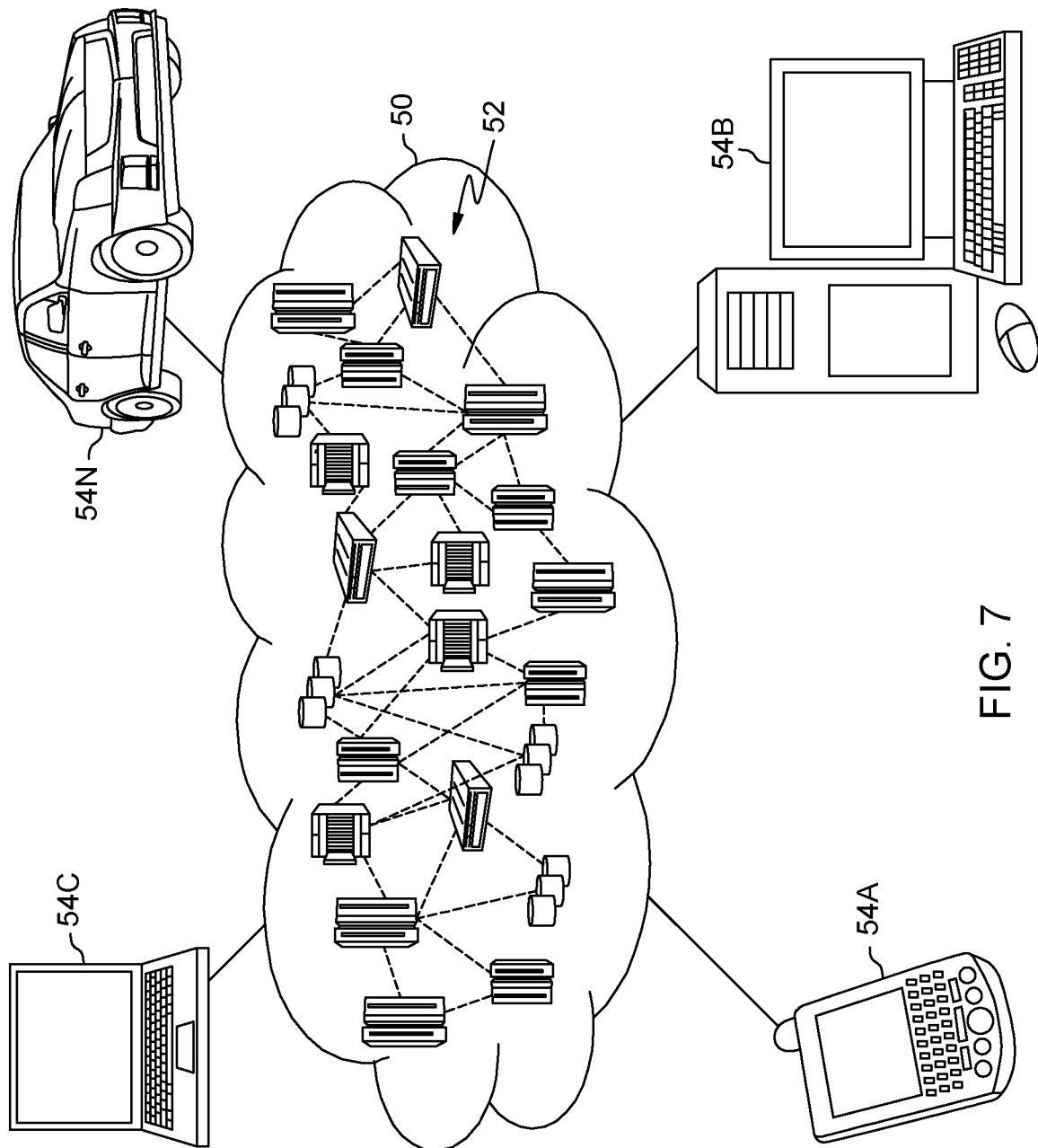
FIG. 7 depicts one embodiment of a cloud computing environment, which may implement, or be used in association with, one or more aspects of the present invention.

Referring now to FIG. 7, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
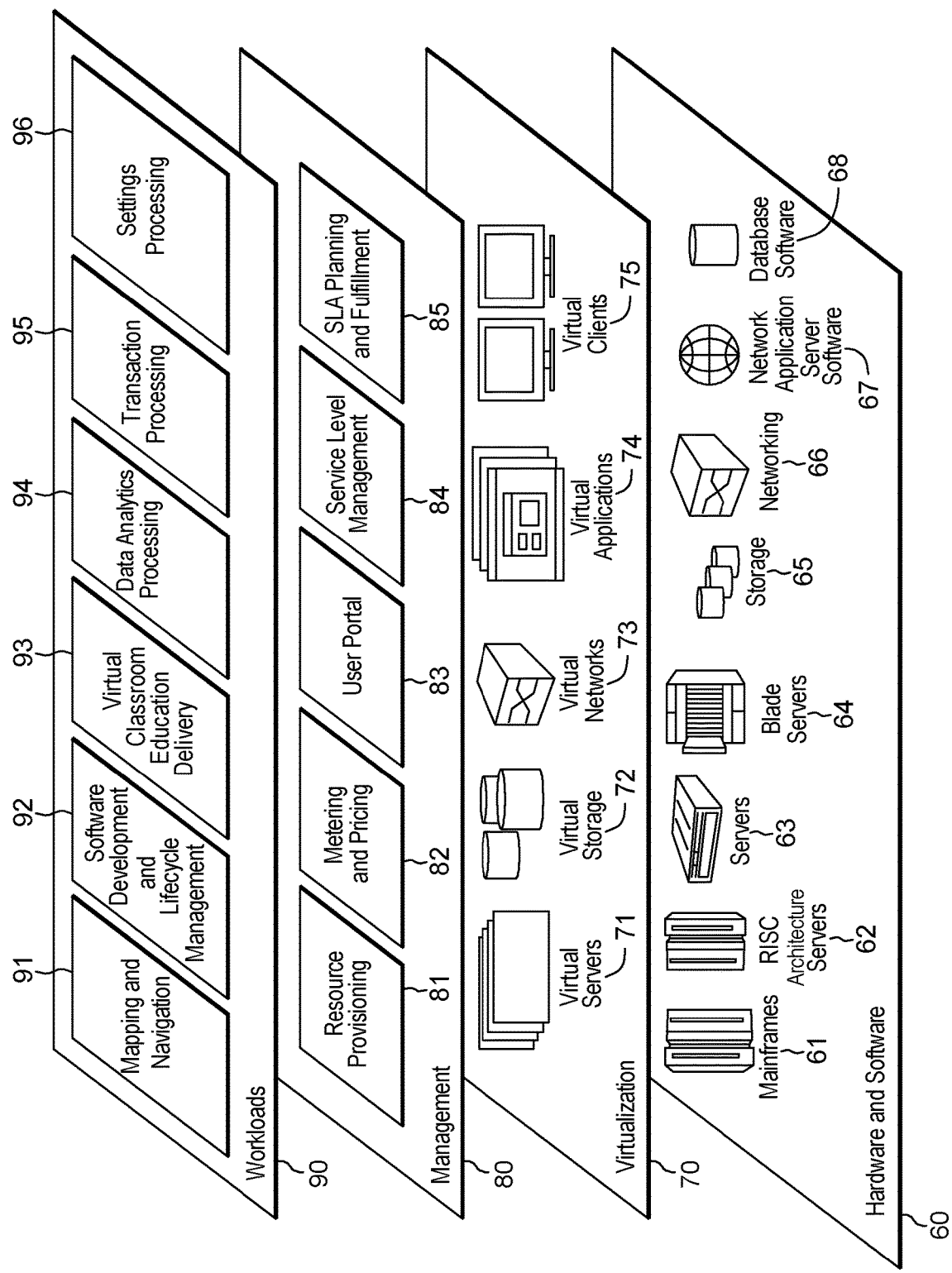
FIG. 8 depicts one example of abstraction model layers, which may facilitate or implement configuring computer system settings for a peripheral device, in accordance with one or more aspects of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and settings processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different types of searches may be used and/or programs of different languages may be searched. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer program product for configuring system settings of a computer for a peripheral device, the computer program product comprising:

a computer readable storage medium having program instructions embodied therewith, the program instructions being executable by a processor to cause the processor to:

detect that a peripheral device has been connected to the computer;

ascertain, based on the detecting, profile-related data, the profile-related data comprising user data of a current user of the computer and location data of a current geographic location of the computer for use in configuring the system settings of the computer for the peripheral device connected to the computer, the location data of the current geographic location of the computer including environment image data that includes data of one or more images capturing an environment in which the computer is currently located, and the user data of the current user of the computer including user image data obtained by capturing an image of the current user;

compare the ascertained profile-related data to saved settings profiles for one or more peripheral devices, the saved settings profiles including location-specific settings profiles for differently configuring the one or more peripheral devices at multiple specific locations and user-specific settings profiles for differently configuring the one or more peripheral devices for multiple specific users, the saved settings profiles facilitating automatic configuration of the system settings of the computer for the one or more peripheral devices based on transport of the computer between the multiple specific locations, the user-specific settings profiles including saved environment images associated with the multiple specific locations and saved user images associated with the multiple specific users;

determine, based on the comparing, whether the saved settings profiles include a settings profile having a location-specific settings profile and a user-specific settings profile for configuring the system settings of the computer for the peripheral device for the current user at the current geographic location, the settings profile being based on the system settings of the computer for the peripheral device having been previously configured at the current geographic location for the current user, and the determining being based on whether there is a rule set match identifying the settings profile for the peripheral device that is specific to the current user at the current geographic location, the rule set match being based, at least in part, on image analytics that determines whether the environment image data of the environment in which the computer is currently located matches one of the saved environment images associated with the multiple specific locations, and the rule set match being based, at least in part, on facial recognition that determines whether the user image data of the current user matches one of the saved user images associated with the multiple specific users;

based on the determining resulting in the rule set match being unsuccessful, use user-provided data to configure the system settings of the computer for the peripheral device, the configuring including generating a new settings profile using the data of the one or more images capturing the environment in which the computer is currently located and using the user image data obtained by capturing the image of the current user, the new settings profile being saved for future use; and based on the determining resulting in the rule set match being successful, automatically configure the system settings associated with the peripheral device connected to the computer, the configuring using the identified settings profile that is specific to the current user for the current geographic location to configure the system settings of the computer.

2. The computer program product of claim 1, wherein the location data of the current geographical location further includes GPS data obtained via based a Global Positioning System.

3. The computer program product of claim 1, wherein the profile-related data further comprises a current Internet Protocol (IP) address of the computer.

4. The computer program product of claim 1, wherein the profile-related data further comprises peripheral-device specific information, the peripheral device being associated with the current geographic location of the computer.

5. The computer program product of claim 4, wherein the peripheral-device specific information comprises at least one of device driver information of the peripheral device and model information of the peripheral device.

6. The computer program product of claim 1, wherein the peripheral device is a peripheral display device, and the identified settings profile identifies, at least in part, a location of the peripheral display device relative to a primary display of the computer for the current geographic location of the computer.

7. The computer program product of claim 1, wherein each saved settings comprises a respective location-specific settings profile, each location-specific settings profile being configured for a different geographic location.

8. The computer program product of claim 1, wherein the image analytics comprises using the data of the one or more images capturing the environment in which the computer is currently located, the one or more images capturing the environment being obtained via a camera associated with the computer, to check for commonalities of components in a background of the current user with elements in the saved environment images.

9. A system for configuring system settings of a computer for a peripheral device, the system comprising:
a memory; and
a processor communicatively coupled to the memory, wherein the system performs a method comprising:
detecting that a peripheral device has been connected to the computer;
based on the detecting, ascertaining profile-related data, the profile-related data comprising user data of a current user of the computer and location data of a current geographic location of the computer for use in configuring the system settings of the computer for the peripheral device connected to the computer, the location data of the current geographic location of the computer including environment image data that includes data of one or more images capturing an environment in which the computer is currently located, and the user data of the current user of the computer including user image data obtained by capturing an image of the current user;
comparing the ascertained profile-related data to saved settings profiles for one or more peripheral devices, the saved settings profiles including location-specific settings profiles for differently configuring the one or more peripheral devices at multiple specific locations and user-specific settings profiles for differently configuring the one or more peripheral devices for multiple specific users, the saved settings profiles facilitating automatic configuration of the system settings of the computer for the one or more peripheral devices based on transport of the computer between the multiple specific locations, the user-specific settings profiles including saved environment images associated with the multiple specific locations and saved user images associated with the multiple specific users;

determining, based on the comparing, whether the saved settings profiles include a settings profile having a location-specific settings profile and a user-specific settings profile for configuring the system settings of the computer for the peripheral device for the current user at the current geographic location, the settings profile being based on the system settings of the computer for the peripheral device having been previously configured at the current geographic location for the current user, and the determining being based on whether there is a rule set match identifying the settings profile for the peripheral device that is specific to the current user at the current geographic location, the rule set match being based, at least in part, on image analytics that determines whether the environment image data of the environment in which the computer is currently located matches one of the saved environment images associated with the multiple specific locations, and the rule set match being based, at least in part, on facial recognition that determines whether the user image data of the current user matches one of the saved user images associated with the multiple specific users;

based on the determining resulting in the rule set match being unsuccessful, use user-provided data to configure the system settings of the computer for the peripheral device, the configuring including generating a new settings profile using the data of the one or more images capturing the environment in which the computer is currently located and using the user image data obtained by capturing the image of the current user, the new settings profile being saved for future use; and based on the determining resulting in the rule set match being successful, automatically configure the system settings associated with the peripheral device connected to the computer, the configuring using the identified settings profile that is specific to the current user for the current geographic location to configure the system settings of the computer.

10. The system of claim 9, wherein the location data of the current geographical location further includes GPS data obtained via a Global Positioning System.

11. The system of claim 9, wherein the peripheral device is a peripheral display device, and the identified settings profile identifies, at least in part, a location of the peripheral display device relative to a primary display of the computer for a current geographic location of the computer.

12. The system of claim 9, wherein each saved settings comprises a respective location-specific settings profile, each location-specific settings profile being configured for a different geographic location.

13. A method of configuring system settings of a computer for a peripheral device, the method comprising:

detecting that a peripheral device has been connected to the computer;

based on the detecting, ascertaining profile-related data, the profile-related data comprising user data of a current user of the computer and location data of a current geographic location of the computer for use in configuring the system settings of the computer for the peripheral device connected to the computer, the location data of the current geographic location of the computer including environment image data that includes data of one or more images capturing an environment in which the computer is currently located, and the user data of the current user of the computer including user image data obtained by capturing an image of the current user;

comparing the ascertained profile-related data to saved settings profiles for one or more peripheral devices, the saved settings profiles including location-specific settings profiles for differently configuring the one or more peripheral devices at multiple specific locations and user-specific settings profiles for differently configuring the one or more peripheral devices for multiple specific users, the saved settings profiles facilitating automatic configuration of the system settings of the computer for the one or more peripheral devices based on transport of the computer between the multiple specific locations, the user-specific settings profiles including saved environment images associated with the multiple specific locations and saved user images associated with the multiple specific users;

determining, based on the comparing, whether the saved settings profiles include a settings profile having a location-specific settings profile and a user-specific settings profile for configuring the system settings of the computer for the peripheral device for the current user at the current geographic location, the settings profile being based on the system settings of the computer for the peripheral device having been previously configured at the current geographic location for the current user, and the determining being based on whether there is a rule set match identifying the settings profile for the peripheral device that is specific to the current user at the current geographic location, the rule set match being based, at least in part, on image analytics that determines whether the environment image data of the environment in which the computer is currently located matches one of the saved environment images associated with the multiple specific locations, and the rule set match being based, at least in part, on facial recognition that determines whether the user image data of the current user matches one of the saved user images associated with the multiple specific users;

based on the determining resulting in the rule set match being unsuccessful, use user-provided data to configure the system settings of the computer for the peripheral device, the configuring including generating a new settings profile using the data of the one or more images capturing the environment in which the computer is currently located and using the user image data obtained by capturing the image of the current user, the new settings profile being saved for future use; and based on the determining resulting in the rule set match being successful, automatically configure the system settings associated with the peripheral device connected to the computer, the configuring using the identified settings profile that is specific to the current user for the current geographic location to configure the system settings of the computer.

14. The method of claim 13, wherein the location data of the current geographical location further includes GPS data obtained via a Global Positioning System.

15. The method of claim 13, wherein each saved settings comprises a respective location-specific settings profile, each location-specific settings profile being configured for a different geographic location.

\* \* \* \* \*